US011746197B2

(12) United States Patent
Delevati et al.

(10) Patent No.: US 11,746,197 B2
(45) Date of Patent: Sep. 5, 2023

(54) BIO-BASED EVA COMPOSITIONS AND ARTICLES AND METHODS THEREOF

(71) Applicant: Braskem S.A., Camaçari (BR)

(72) Inventors: Giancarlos Delevati, São Paulo (BR); Omar Wandir Renck, São Paulo (BR); Carlos Augusto Maia Faria, São Paulo (BR); Paulo Lourenço Brito Herrmann, São Paulo (BR); Marcial Cesar Vieira, São Paulo (BR); Patricia Mara De Freitas Rocha, São Paulo (BR); Marcelo Fioravanti das Neves, São Paulo (BR); Roger Ribeiro Malmegrim, São Paulo (BR)

(73) Assignee: Braskem S.A., Camaçari (BR)

( * ) Notice: Subject to any disclaimer, the term of this patent is extended or adjusted under 35 U.S.C. 154(b) by 0 days.

(21) Appl. No.: 17/071,826

(22) Filed: Oct. 15, 2020

(65) Prior Publication Data
US 2021/0108039 A1 Apr. 15, 2021

Related U.S. Application Data

(60) Provisional application No. 62/915,464, filed on Oct. 15, 2019.

(51) Int. Cl.
B32B 27/30 (2006.01)
C08J 5/18 (2006.01)
B29C 48/00 (2019.01)
B29C 48/08 (2019.01)
B32B 27/08 (2006.01)
B32B 27/32 (2006.01)
C08F 210/02 (2006.01)
C08L 23/06 (2006.01)
C08L 23/08 (2006.01)
B29K 23/00 (2006.01)
B29L 7/00 (2006.01)

(52) U.S. Cl.
CPC .............. *C08J 5/18* (2013.01); *B29C 48/022* (2019.02); *B29C 48/08* (2019.02); *B32B 27/08* (2013.01); *B32B 27/306* (2013.01); *B32B 27/32* (2013.01); *C08F 210/02* (2013.01); *C08L 23/06* (2013.01); *C08L 23/0853* (2013.01); *B29K 2023/083* (2013.01); *B29L 2007/008* (2013.01); *B32B 2250/05* (2013.01); *B32B 2270/00* (2013.01); *C08J 2323/06* (2013.01); *C08J 2323/08* (2013.01); *C08J 2423/06* (2013.01); *C08J 2423/08* (2013.01); *C08L 2205/025* (2013.01); *C08L 2205/035* (2013.01); *C08L 2207/062* (2013.01); *C08L 2207/066* (2013.01)

(58) Field of Classification Search
CPC .............................. B32B 27/306; B32B 27/32
See application file for complete search history.

(56) References Cited

U.S. PATENT DOCUMENTS

| 4,396,789 | A | 8/1983 | Barrocas et al. |
| 5,840,971 | A | 11/1998 | Gubelmann-Bonneau |
| 9,181,143 | B2 | 11/2015 | do Carmo et al. |
| 2006/0272767 | A1* | 12/2006 | Kreitman ................ B32B 27/08 156/244.11 |
| 2011/0287204 | A1 | 11/2011 | Devisme et al. |
| 2017/0183430 | A1 | 6/2017 | Devisme et al. |

FOREIGN PATENT DOCUMENTS

| EP | 0 376 558 A1 | 7/1990 |
| EP | 2346911 B1 | 8/2013 |
| JP | 6011585 B2 | 10/2016 |
| WO | 200001335 A1 | 1/2000 |
| WO | 2010101698 A2 | 9/2010 |
| WO | 2012102778 A1 | 8/2012 |
| WO | 2016014230 A1 | 1/2016 |
| WO | 201694161 A1 | 6/2016 |
| WO | 2018041818 A1 | 3/2018 |
| WO | 2019202405 A1 | 10/2019 |
| WO | 2020234656 A1 | 11/2020 |

OTHER PUBLICATIONS

X. Li et al. "Selective Catalytic Oxidation of Ethanol to Acetic Acid on Dispersed Mo-V-Nb Mixed Oxides" Chemistry A European Journal, 2007, 13, 9324-9330 (7 pages).
B. Jones et al. "The Production of Vinyl Acetate Monomer as a Co-Product from the Non-Catalytic Cracking of Soybean Oil" Processes, 3, Aug. 14, 2015 pp. 619-633 (15 pages).
N. Saichana et al. Abstract of "Acetic acid bacteria: A group of bacteria with versatile biotechnological applications" Biotechnology Advances, vol. 33, Issue 6, part 2, Nov. 1, 2015 (2 pages).
P. Raspor et al., "Biotechnological Applications of Acetic Acid Bacteria", Critical Reviews in Biotechnology, vol. 28, 2008, pp. 101-124 (26 pages).
PCT International Search Report and Written Opinion dated Jul. 8, 2019, in corresponding International Application No. PCT/IB2019/020006 (11 pages).
International Search Report and Written Opinion dated Jun. 29, 2021, in corresponding International Application No. PCT/IB2020/020061 (9 pages).

* cited by examiner

Primary Examiner — Zachary M Davis

(74) Attorney, Agent, or Firm — Osha Bergman Watanabe & Burton LLP

(57) ABSTRACT

A polymer may include a copolymer of ethylene and vinyl acetate, in which the ethylene is at least partially obtained from a renewable source of carbon, and wherein the copolymer has a melt index (190° C./2.16 kg) ranging from 0.12 to 8.0 g/10 min according to ASTM D1238.

20 Claims, No Drawings

BIO-BASED EVA COMPOSITIONS AND ARTICLES AND METHODS THEREOF

BACKGROUND

Polyolefin copolymers such as ethylene vinyl acetate (EVA) may be used to manufacture a varied range of articles, including films, molded products, foams, and the like. In general, polyolefins are widely used plastics worldwide, given their versatility in a wide range of applications. EVA may have characteristics such as high processability, low production cost, flexibility, low density and recycling possibility.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a copolymer of ethylene and vinyl acetate, in which the ethylene is at least partially obtained from a renewable source of carbon, and wherein the copolymer has a melt index (190° C./2.16 kg) ranging from 0.12 to 8.0 g/10 min according to ASTM D1238.

In another aspect, embodiments disclosed herein relate to a film that includes a copolymer of ethylene and vinyl acetate, in which the ethylene is at least partially obtained from a renewable source of carbon, and wherein the copolymer has a melt index (190° C./2.16 kg) ranging from 0.12 to 8.0 g/10 min according to ASTM D1238.

In another aspect, embodiments disclosed herein relate to a multilayer film, that includes at least one layer of a film that includes a copolymer of ethylene and vinyl acetate, in which the ethylene is at least partially obtained from a renewable source of carbon, and wherein the copolymer has a melt index (190° C./2.16 kg) ranging from 0.12 to 8.0 g/10 min according to ASTM D1238.

In yet another aspect, embodiments disclosed herein relate to method of forming an EVA film extruding a biobased EVA to form a film that includes a copolymer of ethylene and vinyl acetate, in which the ethylene is at least partially obtained from a renewable source of carbon, and wherein the copolymer has a melt index (190° C./2.16 kg) ranging from 0.12 to 8.0 g/10 min according to ASTM D1238.

Other aspects and advantages of the claimed subject matter will be apparent from the following description and the appended claims.

DETAILED DESCRIPTION

In one aspect, embodiments disclosed herein relate to compositions containing ethylene vinyl acetate (EVA) copolymers that have at least a portion of the ethylene thereof that is obtained from a renewable source of carbon, such as a plant-based material, i.e., forming a bio-based ethylene vinyl acetate copolymer. In particular embodiments disclosed herein relate to the use of such bio-based ethylene vinyl acetate copolymer in films, especially multi-layer films.

EVA is a copolymer of the polyolefin family of elastomers formed by the sequence of random units derived from the polymerization of ethylene and vinyl acetate at high temperature and pressure. EVA copolymers provide materials that can be processed like other thermoplastics, but may offer a rubbery character having softness and elasticity. The use of products derived from natural sources, as opposed to those obtained from fossil sources, has increasingly been widely preferred as an effective means of reducing the increase in atmospheric carbon dioxide concentration, therefore effectively limiting the expansion of the greenhouse effect. Products thus obtained from natural raw materials have a difference, relative to fossil sourced products, in their renewable carbon contents. This renewable carbon content can be certified by the methodology described in the technical ASTM D 6866-18 Norm, "Standard Test Methods for Determining the Biobased Content of Solid, Liquid, and Gaseous Samples Using Radiocarbon Analysis". Products obtained from renewable natural raw materials have the additional property of being able to be incinerated at the end of their life cycle and only producing $CO_2$ of a non-fossil origin.

Polymer compositions in accordance with the present disclosure may include an EVA copolymer, wherein the percent by weight of ethylene in the EVA polymer ranges from a lower limit selected from one of 60 wt %, 70 wt %, 75 wt %, 80 wt %, 82 wt %, and 85 wt % to an upper limit selected from one of 80 wt %, 85 wt %, 88 wt %, 90 wt %, 93 wt % and 95 wt %, where any lower limit may be paired with any upper limit. Further, of this total amount of ethylene, it is understood that at least a portion of that ethylene is based on a renewable carbon source.

Polymer compositions in accordance with the present disclosure may include EVA copolymers incorporating various ratios of ethylene and vinyl acetate, in addition to including one or more optional additional comonomers. Polymer compositions in accordance with the present disclosure may include an EVA copolymer, wherein the percent by weight of vinyl acetate content as determined by ASTM D5594 in the copolymer ranges from a lower limit selected from one of 5 wt %, 7 wt %, 10 wt %, 12 wt %, 15 wt %, 20 wt % to an upper limit selected from 15 wt %, 18 wt %, 20 wt %, 25%, 30 wt % or 40 wt %, where any lower limit may be paired with any upper limit. Further, of this total amount of vinyl acetate, it is understood that at least a portion of that vinyl acetate may optionally be based on a renewable carbon source.

Specifically, in one or more embodiments, the EVA copolymer exhibits a bio-based carbon content, as determined by ASTM D6866-18 Method B, of at least 50%. Further, other embodiments may include at least 40%, 50%, 60%, 80%, or 100% bio-based carbon. As mentioned above, the total bio-based or renewable carbon in the EVA polymer may be contributed from a bio-based ethylene and/or a bio-based vinyl acetate. Each of these are described in turn.

For example, in one or more embodiments, the renewable source of carbon is one or more plant materials selected from the group consisting of sugar cane and sugar beet, maple, date palm, sugar palm, sorghum, American agave, corn, wheat, barley, sorghum, rice, potato, cassava, sweet potato, algae, fruit, materials comprising cellulose, wine, materials comprising hemicelluloses, materials comprising lignin, wood, straw, sugarcane bagasse, sugarcane leaves, corn stover, wood residues, paper, and combinations thereof.

In one or more embodiments, the bio-based ethylene may be obtained by fermenting a renewable source of carbon to produce ethanol, which may be subsequently dehydrated to produce ethylene. Further, it is also understood that the fermenting produces, in addition to the ethanol, byproducts of higher alcohols. If the higher alcohol byproducts are present during the dehydration, then higher alkene impurities may be formed alongside the ethanol. Thus, in one or more embodiments, the ethanol may be purified prior to dehydration to remove the higher alcohol byproducts while in other embodiments, the ethylene may be purified to remove the higher alkene impurities after dehydration.

Thus, biologically sourced ethanol, known as bio-ethanol, is obtained by the fermentation of sugars derived from cultures such as that of sugar cane and beets, or from hydrolyzed starch, which is, in turn, associated with other cultures such as corn. It is also envisioned that the bio-based ethylene may be obtained from hydrolysis-based products of cellulose and hemi-cellulose, which can be found in many agricultural by-products, such as straw and sugar cane husks. This fermentation is carried out in the presence of varied microorganisms, the most important of such being the yeast *Saccharomyces cerevisiae*. The ethanol resulting therefrom may be converted into ethylene by means of a catalytic reaction at temperatures usually above 300° C. A large variety of catalysts can be used for this purpose, such as high specific surface area gamma-alumina. Other examples include the teachings described in U.S. Pat. Nos. 9,181,143 and 4,396,789, which are herein incorporated by reference in their entirety.

Bio-based vinyl acetate, on the other hand, may also be used in one of more embodiments of the EVA copolymer of the present disclosure. Bio-based vinyl acetate may be produced by producing acetic acid by oxidation of ethanol (which may be formed as described above) followed by reaction of ethylene and acetic acid to acyloxylate the ethylene and arrive at vinyl acetate. Further, it is understood that the ethylene reacted with the acetic acid may also be formed from a renewable source as described above.

In one or more embodiments, a renewable starting material, including those described above, may be fermented and optionally purified, in order to produce at least one alcohol (either ethanol or a mixture of alcohols including ethanol). The alcohol may be separated into two parts, where the first part is introduced into a first reactor and the second part may be introduced into a second reactor. In the first reactor, the alcohol may be dehydrated in order to produce an alkene (ethylene or a mixture of alkenes including ethylene, depending on whether a purification followed the fermentation) followed by optional purification to obtain ethylene. One of ordinary skill in the art may appreciate that if the purification occurs prior to dehydration, then it need not occur after dehydration, and vice versa. In the second reactor, the alcohol may be oxidized in order to obtain acetic acid, which may optionally be purified. In a third reactor, the ethylene produced in the first reactor and the acetic acid produced in the second reactor may be combined and reacted to acyloxylate the ethylene and form vinyl acetate, which may be subsequently isolated and optionally purified. Additional details about oxidation of ethanol to form acetic acid may be found in U.S. Pat. No. 5,840,971 and Selective catalytic oxidation of ethanol to acetic acid on dispersed Mo—V—Nb mixed oxides. Li X, Iglesia E. Chemistry. 2007; 13(33):9324-30.

However, the present disclosure is not so limited in terms of the route of forming acetic acid. Rather, it is also envisioned that acetic acid may be obtained from a fatty acid, as described in "The Production of Vinyl Acetate Monomer as a Co-Product from the Non-Catalytic Cracking of Soybean Oil", Benjamin Jones, Michael Linnen, Brian Tande and Wayne Seames, Processes, 2015, 3, 61-9-633. Further, the production of acetic acid from fermentation performed by acetogenic bacteria, as described in "Acetic acid bacteria: A group of bacteria with versatile biotechnological applications", Saichana N, Matsushita K, Adachi O, Frébort I, Frebortova J. Biotechnol Adv. 2015 Nov. 1; 33(6 Pt 2):1260-71 and Biotechnological applications of acetic acid bacteria. Raspor P, Goranovic D. Crit Rev Biotechnol. 2008; 28(2):101-24. Further, it is also understood that the production of ethylene used to produce vinyl acetate can also be used to form the ethylene that is subsequently reacted with the vinyl acetate to form the EVA copolymer of the present disclosure. Thus, for example, the amount of ethanol that is fed to the first and second reactors, respectively, may be vary depending on the relative amounts of ethylene and vinyl acetate being polymerized.

Polymer compositions in accordance with the present disclosure may include an EVA copolymer, where the EVA copolymer exhibits a melt index determined by ASTM D1238 that may range from a lower limit selected from one of 0.1, 0.12, 0.25 1, 2, or 5 g/10 min, to an upper limit selected from one of 4, 5, 6, 8, or 10 g/10 min measured with a load of 2.16 kg at 190° C., where any lower limit may be paired with any upper limit.

Polymer compositions in accordance with the present disclosure may include an EVA copolymer, where copolymer exhibits a Shore A hardness as determined by ASTM D2240 that may range from a lower limit of any of 75, 77, 80, 85, 88 or 90 Shore A to an upper limit of, 90, 93, 95, or 100 Shore A, where any lower limit may be paired with any upper limit.

Polymer compositions in accordance with the present disclosure may include an EVA copolymer, where copolymer exhibits a Shore D hardness as determined by ASTM D2240 that may range from a lower limit of any of 20, 22, 25, 30, 40, 45, or 50 to an upper limit of 45, 50, 55, or 60 Shore D, where any lower limit may be paired with any upper limit.

Polymer compositions in accordance with the present disclosure may include an EVA copolymer, where copolymer exhibits a Vicat Softening Temperature as determined by ASTM D1525 Method A50 that may range from a lower limit of any of 45, 50, 55, 58, or 60° C. to an upper limit of any of 65, 70, 75, 85, or 90° C., where any lower limit may be paired with any upper limit.

Polymer compositions in accordance with the present disclosure may include an EVA copolymer, where copolymer exhibits a tensile strength at break as determined by ASTM D 638 ranging from 12 to 40 MPa, with a test specimen of 2 mm thickness prepared from compression molded plate according to ASTM D4703. The tensile at break may range from a lower limit of 15, 17, 19, or 22 MPa to upper limit of 25, 30, 33, 35, 35, or 40 MPa where any lower limit can be used in combination with any upper limit.

Polymer compositions in accordance with the present disclosure may include an EVA copolymer, where copolymer exhibits an elongation at break as determined by ASTM D 638 with a test specimen of 2 mm thickness prepared from compression molding plate according to ASTM D4703 of greater than 450%. The elongation at break may have a lower limit of any of 450 or 500%.

Polymer compositions in accordance with the present disclosure may include an EVA copolymer, where copolymer has a melting point as determined by ASTM D3418 with a test specimen of 2 mm thickness prepared from compression molding plate according to ASTM D4703 ranging from 75 to 105° C. The melting point may range from a lower limit of any of 75, 86, 88, 90, or 90° C. to an upper limit of 96, 98, 100, 102, or 105° C., where any lower limit can be used in combination with any upper limit.

EVA copolymers in accordance with the present disclosure may have the following film properties, which are assessed using a 50 μm thickness film, processed in a 50 mm blow film line with barrier screw having a 25:1 L/D and a 1.0 mm die gap at a 2.3:1 blow up ratio.

EVA copolymers in accordance with the present disclosure may have a tensile strength at break, measured on a 50 μm thickness film according to ASTM D 882, ranging from 25 to 45 MPa at machine direction (MD). The tensile strength at break (MD) may have a lower limit of any of 25, 28, 30, or 32 MPa and an upper limit of any of 38, 40, 42, or 45 MPa, where any lower limit can be used in combination with any upper limit.

EVA copolymers in accordance with the present disclosure may have a tensile strength at break, measured on a 50 μm thickness film according to ASTM D 882, ranging from 18 to 38 MPa at transversal direction (TD). The tensile strength at break (TD) may have a lower limit of any of 18, 20, 22 or 24 MPa and an upper limit of any of 30, 32, 35, or 38 MPa, where any lower limit can be used in combination with any upper limit.

EVA copolymers in accordance with the present disclosure may have an elongation at break (MD) measured on a 50 μm thickness film according to ASTM D 882 greater than 450%. The elongation at break (MD) may have a lower limit of any of 450, 475, or 500%.

EVA copolymers in accordance with the present disclosure may have an elongation at break (TD) measured on a 50 μm thickness film according to ASTM D 882 greater than 500%. The elongation at break (TD) may have a lower limit of any of 500, 550, or 600%.

EVA copolymers in accordance with the present disclosure may have Dart Drop Impact Strength measured on a 50 μm thickness film according to ASTM D1709 Method B ranging from 150 to 1200 gF. The Dart Drop Impact strength may have a lower limit of any of 150, 175, or 200 gF and an upper limit of any of 500, 600, 1000, or 1200 gF, where any lower limit can be used in combination with any upper limit.

EVA copolymers in accordance with the present disclosure may have an Elmendorf tear strength (MD) measured on a 50 μm thickness film according to ASTM D1922 greater than 100 gF. The Elmendorf tear strength (MD) may have a lower limit of any of 100 or 130 gF.

EVA copolymers in accordance with the present disclosure may have an Elmendorf Tear Strength (TD) measured on a 50 μm thickness film according to ASTM D1922 greater than 150 gF. The Elmendorf tear strength (TD) may have a lower limit of any of 150 or 190 gF.

EVA copolymers in accordance with the present disclosure may have a haze measured on a 50 μm thickness film according to ASTM D1003 less than 5%. The haze may have an upper limit of any of 5 or 3%.

EVA copolymers in accordance with the present disclosure may have a gloss at an angle of 45° measured on a 50 μm thickness film according to ASTMD2457 greater than 80. The gloss may have a lower limit of any of 80 or 90.

Films

One or more embodiments of the present disclosure may be directed to films, which may be a monolayer or multilayer structure. In one or more embodiments, the monolayer film or at least one layer of a multilayer film may include a blend of linear low density polyethylene (LLDPE) present in an amount ranging from 30 to 80%, a biobased EVA copolymer, such as those described above, present in an amount ranging from 3 to 65%, low density polyethylene (LDPE) present in an amount ranging from 15 to 50% of LDPE, and high density polyethylene (HDPE) present in an amount ranging from 20 to 40%.

Multilayer Film Structures

Industrial Bags

One or more embodiments of the present disclosure incorporate the biobased EVA copolymers described herein into a multilayer film that may have particular applicability in industrial bags, which may be a co-extruded or laminated multilayer film formed with at least three layers. The biobased EVA may be added to improve the mechanical properties (i.e., as an impact modifier) and adhesion. In one or more embodiments, the multilayer film structure may include:

an inner layer comprising a blend of a LLDPE present in an amount ranging from 30 to 50 wt % of the blend, EVA present in an amount ranging from 0 to 20 wt % of the blend, LDPE present in an amount ranging from 10 to 20 wt %, and HDPE present in an amount ranging from 0 to 40 wt % of the blend;

an outer layer comprising a blend of LLDPE present in an amount ranging from 50 to 70 wt % of the blend, EVA present in an amount ranging from 0 to 10 wt % of the blend, and LDPE present in an amount ranging from 40 to 60 wt % of the blend; and a middle layer comprising a blend of LLDPE present in an amount ranging from 30 to 50 wt % of the blend, EVA present in an amount ranging from 5 to 20 wt % of the blend, LDPE present in an amount ranging from 10 to 20 wt % of the blend, and HDPE present in an amount ranging from 0 to 40 wt % of the blend, wherein at least one of EVA in the inner, outer or middle layer is a biobased EVA as described herein.

Food Packaging

One or more embodiments of the present disclosure incorporate the biobased EVA copolymers described herein into a multilayer film that may have particular applicability in food packaging, which may be formed, for example, through a double bubble process with at least five or seven layers. The biobased EVA may be added to contribute to shrinkage and adhesiveness.

In one or more embodiments, the multilayer film structure may have a thickness of 20 to 120 μm and may include:

a first layer of PE, such as LDPE, LLDPE, and/or very low density polyethylene (VLDPE), which may represent 20 to 40 wt % of the multilayer film;

a second layer comprising EVA, which may include a biobased EVA copolymer as described above, which may represent 10 to 20 wt % of the multilayer film;

a third layer comprising a barrier polymer selected from polyvinylidene chloride (PVDC), polyamide, and ethylene vinyl alcohol (EVOH), which may represent 5 to 15 wt % of the multilayer film;

a fourth layer comprising an EVA, which may include a biobased EVA copolymer as described above, which may represent 10 to 20 wt % of the multilayer film; and a fifth layer comprising a sealant such as LLDPE, VLDPE, and/or LDPE, which may represent 20 to 40 wt % of the multilayer film.

In particular embodiments, the first layer (the outermost layer) may be responsible for the structure of the film and may be prepared with LLDPE and/or LDPE with the following properties (film properties measured on a 50 micron thickness as described above): density measured according to ASTM D792 ranging from 0.915 to 0.925 g/cm$^3$; melt flow rate measured according to ASTM D1238 at 190° C. and 2.16 kg ranging from 0.5 to 3.5 g/10 min; tensile strength at break (MD) measured according to ASTM D 882 ranging from 20 to 50 MPa; tensile strength at break (TD) measured according to ASTM D 882 ranging from 18 to 50 MPa; elongation at break (MD) measured according to ASTM D 882 greater than 275%; elongation at break (TD) measured according to ASTM D 882 ranging from 750%; Dart Drop Impact measured according to ASTM D 1709 ranging from 75 to 1500 g/F50; Elmendorf Tear Strength (MD) measured according ASTM D 1922 greater than 125 gF; Elmendorf Tear Strength (TD) measured according ASTM D 1922 greater than 150 gF. Example grades include: EB853, EB852/72, TN7006, TS7006, Flexus 9212XP, Proxess 1509XP, Proxess 1809, Flexus 9211, Flexus 9200, HF2208S3, HF2207B5, LF0720/21AF, LF0720/20AF and LF1020/21AF, all of which are commercially available from Braskem.

The second and fourth layers may be prepared with a biobased EVA copolymer, such as those described in the aforementioned paragraphs. The EVA copolymer layer may be responsible for adhesion between the barrier layer and the external layers. In a particular embodiment, the second and fourth layers are formed from a composition of EVA copolymers that has a final vinyl acetate content of at 12 to 28 wt %. In one or more embodiments, the composition of EVA may be a mixture of a biobased EVA as described above and a petrochemical based EVA, wherein the final vinyl acetate content of the EVA composition ranges from 12 to 28 wt % of the composition.

The third layer is responsible for barrier properties and may be prepared with polymers such as PVDC, polyamide (such as nylon) and EVOH.

In particular, the fifth layer (the innermost layer) may be responsible for the sealing of the film and may be prepared with LLDPE and/or LDPE with the following properties (film properties measured on a 50 micron thickness as described above): density measured according to ASTM D792 ranging from 0.905 to 0.925 g/cm$^3$; melt flow rate measured according to ASTM D1238 at 190° C. and 2.16 kg ranging from 0.5 to 4.5 g/10 min; tensile strength at break (MD) measured according to ASTM D 882 ranging from 20 to 50 MPa; tensile strength at break (TD) measured according to ASTM D 882 ranging from 18 to 50 MPa; elongation at break (MD) measured according to ASTM D 882 greater than 275%; elongation at break (TD) measured according to ASTM D 882 ranging from 750%; Dart Drop Impact measured according to ASTM D 1709 (A) ranging from 75 to 1500 g/F50; Elmendorf Tear Strength (MD) measured according ASTM D 1922 greater than 125 gF; Elmendorf Tear Strength (TD) measured according ASTM D 1922 greater than 150 gF. Example grades include: EB853, EB852/72, TN7006, TS7006, Flexus 9212XP, Proxess 1509XP, Proxess 1809, Flexus 9211, Flexus 9200, HF2208S3, HF2207B5, LF0720/21AF, LF0720/20AF and LF1020/21AF, Flexus Cling, all of which are commercially available from Braskem.

The multilayer structure described above is a five-layer structure, and it is also envisioned that a seven-layer structure may be used. Thus, in one or more embodiments, a multilayer film may have a thickness ranging from 20 to 120 µm and may include the following layers:
 a first layer of a PE, such as LDPE, and/or LLDPE, and/or VLDPE, which may represent 15 to 25 wt % of the multilayer film;
 a second layer comprising an EVA, which may include a biobased EVA copolymer as described above, and which may represent 10 to 20 wt % of the multilayer film;
 a third layer comprising a tie layer, which may include a biobased EVA copolymer as described above, and which may represent 10 to 20 wt % of the multilayer film;
 a fourth layer comprising a barrier polymer such as PVDC, polyamide (such as nylon), and EVOH, which may represent 10 to 20 wt % of the multilayer film;
 a fifth layer comprising a tie layer, which may include a biobased EVA copolymer as described above, and which may represent 10 to 20 wt % of the multilayer film;
 a sixth layer comprising EVA, which may include a biobased EVA copolymer as described above, and which may represent 10 to 20 wt % of the multilayer film; and
 a seventh layer comprising a PE, such as such as LLDPE, VLDPE, mLLDPE, which may represent 15 to 25 wt % of the multilayer film.

In particular, the first layer (the outermost layer) may be responsible for the structure of the film and may be prepared with LLDPE and/or LDPE with the following properties (film properties measured on a 50 micron thickness as described above): density measured according to ASTM D792 ranging from 0.915 to 0.925 g/cm$^3$; melt flow rate measured according to ASTM D1238 at 190° C. and 2.16 kg ranging from 0.5 to 3.5 g/10 min; tensile strength at break (MD) measured according to ASTM D 882 ranging from 20 to 50 MPa; tensile strength at break (TD) measured according to ASTM D 882 ranging from 18 to 50 MPa; elongation at break (MD) measured according to ASTM D 882 greater than 275%; elongation at break (TD) measured according to ASTM D 882 ranging from 750%; Dart Drop Impact measured according to ASTM D 1709 ranging from 75 to 1500 g/F50; Elmendorf Tear Strength (MD) measured according ASTM D 1922 greater than 125 gF; Elmendorf Tear Strength (TD) measured according ASTM D 1922 greater than 150 gF. Example grades include: EB853, EB852/72, TN7006, TS7006, Flexus 9212XP, Proxess 1509XP, Proxess 1809, Flexus 9211, Flexus 9200, HF2208S3, HF2207B5, LF0720/21AF, LF0720/20AF and LF1020/21AF, all of which are commercially available from Braskem.

The second and sixth layers are structural layers that may give mechanical properties to the film and may be prepared with a biobased EVA copolymer, such as those described in the aforementioned paragraphs.

The third and fifth layers may be responsible for adhesion between the barrier layer and the intermediate layers and may be prepared with a biobased EVA copolymer such as described in the aforementioned paragraphs. In particular embodiments, the EVA in the third and/or fifth layers may have a vinyl acetate content of 12 to 28 wt % of the EVA. In other embodiments, the EVA may be a EVA composition comprising a biobased EVA and a petrochemical EVA, wherein the final vinyl acetate content of the EVA composition ranges from 12 to 28 wt % of the EVA composition.

The fourth layer is responsible for barrier properties and may be prepared with polymers such as PVDC, polyamide (such as nylon), and EVOH.

In particular, the seventh layer (the innermost layer) may be responsible for the sealing of the film and may be prepared with such as LLDPE, VLDPE, and/or LDPE, with the following properties (film properties measured on a 50 micron thickness as described above): density measured according to ASTM D792 ranging from 0.905 to 0.925 g/cm$^3$; melt flow rate measured according to ASTM D1238 at 190° C. and 2.16 kg ranging from 0.5 to 4.5 g/10 min;

tensile strength at break (MD) measured according to ASTM D 882 ranging from 20 to 50 MPa; tensile strength at break (TD) measured according to ASTM D 882 ranging from 18 to 50 MPa; elongation at break (MD) measured according to ASTM D 882 greater than 275%; elongation at break (TD) measured according to ASTM D 882 ranging from 750%; Dart Drop Impact measured according to ASTM D 1709 ranging from 75 to 1500 g/F50; Elmendorf Tear Strength (MD) measured according ASTM D 1922 greater than 125 gF; Elmendorf Tear Strength (TD) measured according ASTM D 1922 greater than 150 gF. Example grades include: EB853, EB852/72, TN7006, TS7006, Flexus 9212XP, Proxess 1509XP, Proxess 1809, Flexus 9211, Flexus 9200, HF2208S3, HF2207B5, LF0720/21AF, LF0720/20AF and LF1020/21AF, Flexus Cling, all of which are commercially available from Braskem.

In one or more embodiments, the multilayer films may be prepared with the biobased EVA, as described above, and may be treated with electron beam irradiation and subsequently filled with food and be submitted to a hot bath for film shrinkage.

Hood Stretch Films

In another embodiment, the biobased EVA copolymers may be used in the production of hood stretch films, which may have a thickness ranging from 50 to 180 μm and may have three layers as detailed below:
- a first layer of a PE, such as LDPE and/or LLDPE, and which may represent 10 to 30 wt % of the multilayer film;
- a second layer comprising biobased EVA and an optional LLDPE and/or LDPE, and which may represent 40 to 80 wt % of the multilayer film; and
- a third layer of a PE, such as LDPE and/or LLDPE and which may represent 10 to 30 wt % of the multilayer film.

In particular, the first layer (the outermost layer) may be responsible for the mechanical properties of the film and may be prepared with LDPE and/or LLDPE with the following properties (film properties measured on a 50 micron thickness as described above): density measured according to ASTM D792 ranging from 0.915 to 0.925 g/cm$^3$; melt flow rate measured according to ASTM D1238 at 190° C. and 2.16 kg ranging from 0.5 to 3.5 g/10 min; tensile strength at break (MD) measured according to ASTM D 882 ranging from 20 to 50 MPa; tensile strength at break (TD) measured according to ASTM D 882 ranging from 18 to 50 MPa; elongation at break (MD) measured according to ASTM D 882 greater than 275%; elongation at break (TD) measured according to ASTM D 882 ranging from 750%; Dart Drop Impact measured according to ASTM D 1709 ranging from 125 to 1500 g/F50; Elmendorf Tear Strength (MD) measured according ASTM D 1922 greater than 125 gF; Elmendorf Tear Strength (TD) measured according ASTM D 1922 greater than 150 gF. Example grades include: Flexus 9212XP, Flexus 9211, Flexus 9200, Proxess 1509XP, Proxess 1806S3, HF2208S3, HF2207B5, TX7003, TS7003, TN7006 and TS7006, all of which are commercially available from Braskem.

In particular, the second layer may be responsible for elastic behavior and form memory and may be prepared with a composition comprising the biobased EVA described above and optionally a PE selected from LLDPE and/or LDPE. In one or more embodiments, the biobased EVA in the middle layer may have a vinyl acetate content ranging from 4 to 20 wt %. In one or more embodiments, the LDPE and/or LLDPE may be present in an amount up to 50 wt % of the layer. The LLDPE and LDPE may include those having the properties described herein.

In particular, the third layer (the innermost layer) may be responsible for the mechanical properties of the film and sealing and may be prepared with LLDPE and/or LDPE with the following properties (film properties measured on a 50 micron thickness as described above): density measured according to ASTM D792 ranging from 0.915 to 0.925 g/cm$^3$; melt flow rate measured according to ASTM D1238 at 190° C. and 2.16 kg ranging from 0.5 to 3.5 g/10 min; tensile strength at break (MD) measured according to ASTM D 882 ranging from 20 to 50 MPa; tensile strength at break (TD) measured according to ASTM D 882 ranging from 18 to 50 MPa; elongation at break (MD) measured according to ASTM D 882 greater than 275%; elongation at break (TD) measured according to ASTM D 882 ranging from 750%; Dart Drop Impact measured according to ASTM D 1709 ranging from 125 to 1500 g/F50; Elmendorf Tear Strength (MD) measured according ASTM D 1922 greater than 125 gF; Elmendorf Tear Strength (TD) measured according ASTM D 1922 greater than 150 gF. Example grades include: Flexus 9212XP, Flexus 9211, Flexus 9200, Proxess 1509XP, Proxess 1806S3, HF2208S3, HF2207B5, TX7003, TS7003, TN7006 and TS7006, all of which are commercially available from Braskem.

In one or more embodiments, the hood stretch film may have a maximum force in a puncture resistance test, measured according to ASTM D4695, ranging from 5 to 20 N.

In one or more embodiments, the hood stretch film may have an energy at break in a puncture resistance test, measured according to ASTM D4695, ranging from 50 to 300 mJ.

In one or more embodiments, the hood stretch film may have a retained force in an elastic recovery test, measured according to ASTM D5459, ranging from 5 to 20 N.

In one or more embodiments, the hood stretch film may have residual deformation in an elastic recovery test, measured according to ASTM D5459, ranging from 10 to 30%.

In one or more embodiments, the hood stretch film may have elastic memory, measured according to ASTM D5459, ranging from 30 to 200%.

Additives

Polymer compositions in accordance with the present disclosure may include fillers and additives that modify various physical and chemical properties when added to the polymer composition during blending that include one or more polymer additives such as processing aids, lubricants, antistatic agents, clarifying agents, nucleating agents, beta-nucleating agents, slipping agents, antioxidants, compatibilizers, antacids, light stabilizers such as HALS, IR absorbers, whitening agents, inorganic fillers, organic and/or inorganic dyes, anti-blocking agents, processing aids, flame-retardants, plasticizers, biocides, adhesion-promoting agents, metal oxides, mineral fillers, glidants, oils, antioxidants, antiozonants, accelerators, and vulcanizing agents.

Film Formation

As mentioned above, one or more embodiments of the present disclosure may be directed to films, including mono- and multi-layer films. Thus, one or more embodiments are directed to extruding a biobased EVA copolymer, including those described above, to form a film. In particular embodiments involving a multilayer structure, the extruding may include co-extruding the biobased EVA with at least one other polymer to form a multi-layer film. In other embodiments involving a multilayer structure, the extruding may include extruding a first layer (including the biobased EVA described herein), extruding at least one other polymer to form at least one other film layer, and laminating the two or more film to form the multi-layer film. Further, in one or more embodiments, the extruded film (monolayer or multi-layer) may be irradiated with electron beam.

Other Applications

Biobased EVA as described herein may be generally applied in coextrusion, cooled and frozen food packaging, food packaging, high transparency films with high mechanical resistance, thermal films to cover agricultural greenhouses, agricultural films, geomembranes, laminating films, as sealant layers, stretch films and injection molded parts.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed:

1. A multilayer film comprising at least one layer comprising a copolymer of ethylene and vinyl acetate and at least one layer comprising at least one other polymer, the multilayer film having a thickness ranging from 20 to 120 μm, in which the ethylene is at least partially obtained from a renewable source of carbon, the vinyl acetate is present in an amount ranging from 7 to 20 wt % of the copolymer, and wherein the copolymer has a melt index (190° C./2.16 kg) ranging from 0.12 to 8.0 g/10 min according to ASTM D1238,
    wherein at least one layer of the multilayer film comprises a blend of the copolymer of ethylene at least partially obtained from the renewable source of carbon and vinyl acetate, linear low density polyethylene (LLDPE), and low density polyethylene (LDPE).

2. The multilayer film of claim 1, wherein the vinyl acetate is at least partially obtained from a renewable source of carbon.

3. The multilayer film of claim 1, wherein the copolymer exhibits a biobased carbon content as determined by ASTM D6866-18 Method B of at least 50%.

4. The multilayer film of claim 1, wherein the multilayer film comprises a blend of linear low density polyethylene (LLPDE) present in an amount ranging from 30 to 80%, the copolymer of claim 1 present in an amount ranging from 3 to 65%, low density polyethylene (LDPE) present in an amount ranging from 15 to 50%, and high density polyethylene (HDPE) present in an amount ranging from 20 to 40%.

5. The multilayer film of claim 1, comprising:
    an inner layer comprising a blend of a linear low density polyethylene (LLDPE) present in an amount ranging from 30 to 50 wt % of the blend, ethylene vinyl acetate (EVA) present in an amount ranging from 0 to 20 wt % of the blend, LDPE present in an amount ranging from 10 to 20 wt %, and high density polyethylene (HDPE) present in an amount ranging from 0 to 40 wt % of the blend;
    an outer layer comprising a blend of linear low density polyethylene (LLDPE) present in an amount ranging from 50 to 70 wt % of the blend, ethylene vinyl acetate (EVA) present in an amount ranging from 0 to 10 wt % of the blend, and low density polyethylene (LDPE) present in an amount ranging from 40 to 60 wt % of the blend; and
    a middle layer comprising a blend of linear low density polyethylene (LLDPE) present in an amount ranging from 30 to 50 wt % of the blend, ethylene vinyl acetate (EVA) present in an amount ranging from 5 to 20 wt % of the blend, low density polyethylene (LDPE) present in an amount ranging from 10 to 20 wt % of the blend, and high density polyethylene (HDPE) present in an amount ranging from 0 to 40 wt % of the blend,
    wherein at least one of ethylene vinyl acetate (EVA) in the inner, outer or middle layer is the copolymer of claim 1.

6. The multilayer film of claim 1, comprising:
    a first layer comprising a polyethylene (PE);
    a second layer comprising an ethylene vinyl acetate (EVA);
    a third layer comprising a barrier polymer;
    a fourth layer comprising an ethylene vinyl acetate (EVA); and
    a fifth layer comprising a sealant,
    wherein at least one of the ethylene vinyl acetate (EVA) in the second or fourth layer is a copolymer of claim 1,
    wherein at least one of the second layer and the fourth layer further comprises linear low density polyethylene (LLDPE) and low density polyethylene (LDPE), and
    wherein the ethylene vinyl acetate (EVA) of at least one of the second layer and the fourth layer is the copolymer of ethylene at least partially obtained from the renewable source of carbon and vinyl acetate.

7. The multilayer film of claim 6, wherein:
    the first layer represents 20 to 40 wt % of the multilayer film;
    the second layer represents 10 to 20 wt % of the multilayer film;
    the third layer represents 5 to 15 wt % of the multilayer film;
    the fourth layer represents 10 to 20 wt % of the multilayer film; and
    the fifth layer represents 20 to 40 wt % of the multilayer film.

8. The multilayer film of claim 6, further comprising: a tie layer between each of the second and third layers and the third and fourth layers.

9. The multilayer film of claim 8 wherein the tie layers comprise an ethylene vinyl acetate (EVA) with a vinyl acetate content of 12 to 28 wt %.

10. The multilayer film of claim 8, wherein the ethylene vinyl acetate (EVA) in the tie layers is a biobased ethylene vinyl acetate (EVA).

11. The multilayer film of claim 8, wherein:
    the first layer represents 15 to 25 wt % of the multilayer film;
    the second layer represents 10 to 20 wt % of the multilayer film;
    the third layer represents 10 to 20 wt % of the multilayer film;
    the fourth layer represents 10 to 20 wt % of the multilayer film;

the fifth layer represents 15 to 25 wt % of the multilayer film; and each tie layer represents 10 to 20 wt % of the multilayer film.

12. The multilayer film of claim 1 comprising:

a first layer representing 10 to 30 wt % of the multilayer film and comprising a polyethylene (PE);

a second layer representing 40 to 80 wt % of the multilayer film and comprising biobased ethylene vinyl acetate (EVA), linear low density polyethylene (LLDPE) and low density polyethylene (LDPE); and a third layer representing 10 to 30 wt % of the multilayer film and comprising a polyethylene (PE).

13. The multilayer film of claim 12, wherein the multilayer film has a maximum force in a puncture resistance test, measured according to ASTM D4695, ranging from 5 to 20 N.

14. The multilayer film of claim 12, wherein the multilayer film has an energy at break in a puncture resistance test, measured according to ASTM D4695, ranging from 50 to 300 mJ.

15. The multilayer film of claim 12, wherein the multilayer film has a retained force in an elastic recovery test, measured according to ASTM D5459, ranging from 5 to 20 N.

16. The multilayer film of claim 12, wherein the multilayer film has residual deformation in an elastic recovery test, measured according to ASTM D5459 ranging from 10 to 30%.

17. The multilayer film of claim 12, wherein the multilayer film has elastic memory, measured according to ASTM D5459 ranging from 30 to 200%.

18. A method of forming an ethylene vinyl acetate (EVA) film, comprising:

fermenting a renewable source of carbon to produce bio-based ethanol;

converting the bio-based ethanol into bio-based ethylene;

reacting ethylene, which is at least partially the bio-based ethylene, with vinyl acetate to produce a biobased ethylene vinyl acetate (EVA); and extruding the biobased ethylene vinyl acetate (EVA) to form the multilayer film of claim 1.

19. The method of claim 18, wherein:

the vinyl acetate is at least partially a bio-based vinyl acetate, the bio-based vinyl acetate is produced by a method comprising:

oxidizing the bio-based ethanol to produce acetic acid; and reacting ethylene with the acetic acid to produce the bio-based vinyl acetate.

20. The method of claim 19, wherein the acetic acid is obtained from fatty acid.

* * * * *